Patented Nov. 10, 1942

2,301,342

UNITED STATES PATENT OFFICE 2,301,342

OLEFIN ISOMERIZATION

Simpson D. Sumerford and Kenneth C. Laughlin, Baton Rouge, La., assignors to Standard Oil Development Company, a corporation of Delaware No Drawing. Application January 2, 1941
Serial No. 372,894

5 Claims. (Cl. 260—683)

The present invention relates to a process of isomerizing normal or straight chain mono-olefins containing at least 4 carbon atoms per molecule into their corresponding iso or branched chain isomers. More specifically this result is accomplished by contacting the normal mono-olefin feed under suitable isomerizing reaction conditions with a novel isomerization catalyst.

In particular, the invention is concerned with the conversion of such mono-olefins as the n-butenes, n-pentenes, etc., the secondary pentenes, secondary hexenes, etc., into the corresponding iso or other highly branched chain mono-olefins such as isobutene, isopentene, etc. These more compactly arranged olefin molecules possess highly desirable characteristics particularly when polymerized or copolymerized with the other reactants and hydrogenated to yield iso-octane and higher closely related homologues which find ready utility as constituents of motor fuels for increasing their anti-knock characteristics.

In carrying out the present invention, a straight chain olefin or a slightly branched chain olefin such as, for example, a normal butene or a secondary pentene is contacted at a temperature between about 400° F. and 1200° F., preferably between about 600° F. and about 1100° F. either at atmospheric pressure or under super-atmospheric pressures ranging up to as high as about 800 lbs. per square inch while maintaining the olefin in the reaction and catalyst zone for between about 0.05 second and about 60 seconds, preferably between about 0.1 second and about 10.0 seconds in contact with a catalyst composed of boron oxide intimately co-mingled with alumina or silica. The catalyst mass may be ordinarily so placed in a suitable reaction chamber as to constitute a bed or a series of tubes filled with catalyst concentrically arranged in a reaction chamber and terminating in a plate header at either end may be employed. Suitable heat transfer means such as molten metal baths, superheated steam, electric furnace resistance coils, etc., or other convenient means are also employed for maintaining the heretofore indicated temperature in the reaction chamber. A suitable concentration of boron oxide ($B_2O_3$) by weight based on the alumina or silica may range between about 1% and about 50%, preferably between about 5% and about 30%.

The exact chemical composition of the catalyst is not known. However, this is of no particular importance since its processes of preparation are relatively simple and readily understood. One method of obtaining a catalyst having the desired activity is as follows:

Alumina gel, prepared by combining a 10% solution of hydrated aluminum sulfate with a normal solution of ammonium hydroxide while vigorously stirring at substantially room temperature, was washed free of reaction products and treated with about 6% of acetic acid for several hours. After draining, the treated gel was impregnated with a boric acid solution so as to give about 10% of boron oxide in the finished catalyst. The impregnated alumina was drained and allowed to dry slowly after which it was activated at a temperature of 800° F. for a 4-hour period. The resulting product was formed into pills for use in isomerizing olefins.

By another method, gelatinous alumina gel prepared as previously described but unpeptized with acid was impregnated with the desired amount of boric acid solution, drained, dried and activated as before. In still another modification, a dried alumina gel was impregnated with boric acid solution as before, heated to 800° F. to dry and decompose the acid to the oxide and activated at 850° F.

The feed stock employed may be quite varied in nature. The normal butenes, n-pentenes and higher straight chain olefins, the higher and slightly branched olefins such as the secondary pentenes, secondary hexenes, heptenes, octenes, etc. and the like are suitable feed stocks. It is preferred however, to use the 4, 5 and possibly 6 carbon atom olefins because of the fact that the higher olefins have a much greater tendency toward cracking even under the relatively short reaction times. It is not necessary to employ single olefins but mixtures of two or more may be employed. However, here again the particular reaction conditions best suited to secure optimum yields of the iso-olefin of one of the components of the feed may be somewhat at variance with the best conditions for the other constituent.

If olefin mixtures are employed, it is preferred to employ those olefins which are adjacent homologues. The presence of paraffins and small amounts of iso-olefins in the feed is not considered to materially disrupt the process. Thus, for example, a partially dehydrogenated field butane and refinery $C_4$ and/or $C_5$ cuts, particularly those coming from thermal or catalytic cracking units, are desirable feed stocks. If the percentage of iso-olefins present in these feed stocks is substantial, it is oftentimes desirable to subject the feed to a preliminary selective iso-olefin absorption treatment such as with 60% to 70% $H_2SO_4$ in order to remove and recover any substantial amounts of iso-olefins present.

The reaction is preferably carried out as a continuous process although it may also proceed as a batch operation. Except in the case of feed stocks which have constituents of chiefly $C_6$ and higher olefins, the reaction is at all times carried out in the vapor phase. In some specific instances, sufficient superatmospheric pressure may be applied to maintain a substantially liquid phase operation. In liquid phase operation care should be taken to insure intensive agitation of the liquid with the catalyst mass or bed and if desired, the bed may be of the rotating or centrifugal type to insure this agitation.

As illustrative of several specific operations carried out in accordance with the invention but not intended as restricting the invention thereto, the results obtained in a series of experimental runs are given.

A bed type of catalyst chamber fitted with a suitable temperature control and containing about 37.0 grams of a catalyst composition containing about 10% by weight of $B_2O_3$ on peptized alumina and prepared according to the preceding description had continuously introduced therein a feed stock containing about 5% of normal butane, about 88% of n-butenes, about 1.5% of heavier and lighter hydrocarbons under the following conditions to give the indicated yields of isobutene.

*Table I*

| Absolute pressure lbs./sq. in. | Contact time | Temp. | Iso-$C_4$ olefins | Selectivity |
|---|---|---|---|---|
| | Seconds | °F. | Volume per cent | |
| 3.68 | 0.14 | 1120 | 17.6 | 91 |
| 3.68 | 0.14 | 1116 | 10.4 | 75 |
| 15 [1] | 0.18 | 1118 | 17.6 | 70 |

[1] Steam added to reduce partial pressure of the $C_4$ hydrocarbons to 4.0 pounds per square inch obsolute.

The iso-olefinic reaction product may be recovered from the reacted mixture by any suitable method, among which may be mentioned selective absorption of, for example, isobutylene in $H_2SO_4$, fractional distillation, or by extraction processes; the unreacted n-olefins (n-butenes) may then be recycled to the isomerization reaction zone.

Continued and prolonged usage of the novel catalyst composition results in a clogging of the pores of the mass with decomposition products principally highly carbonaceous in character. The catalyst mass may be subjected to a regeneration or restoration treatment comprising burning off of these deleterious deposits with a forced draft of air or oxygen, the oxygen being diluted with an inert gas such as $CO_2$, flue gas, or nitrogen to avoid excessive heat evolution followed by reuse of the reactivated catalyst mass. Any other conventional reactivating treatment may be employed if convenient.

Having thus fully described and illustrated the nature of the invention, what is claimed as new and useful and desired to be secured by Letters Patent is:

1. A process for producing iso-mono-olefins from non - tertiary - carbon - atom - containing mono-olefins having at least 4 carbon atoms per molecule which comprises contacting said last named mono-olefins under isomerization reaction conditions with a catalyst composition comprising essentially boron oxide and alumina.

2. A process which comprises contacting normal mono-olefin with a catalyst composition comprising essentially boron oxide and alumina at a temperature between about 400 and about 1200° F. for between about 0.1 second and about 60 seconds and recovering iso-mono-olefin therefrom.

3. A process as in claim 2 wherein the normal mono-olefin is a refinery $C_4$ cut comprising essentially normal butenes.

4. A process which comprises contacting normal butenes with a 10% boron oxide on peptized alumina gel at a temperature between about 600° F. and about 1100° F. for from between about 0.1 second and about 10.0 seconds under a pressure between about 15 lbs. per square inch and about 800 lbs. per square inch and recovering the isobutene produced.

5. A process as in claim 4 wherein normal pentenes replace normal butenes and wherein isopentene is recovered instead of isobutene.

SIMPSON D. SUMERFORD.
KENNETH C. LAUGHLIN.